(12) United States Patent
Pete et al.

(10) Patent No.: US 7,219,778 B2
(45) Date of Patent: May 22, 2007

(54) EXCITER RING FOR A BRAKE ROTOR

(75) Inventors: Reginal A. Pete, Caledonia, IL (US);
Omar J. Fakhoury, Rockford, IL (US);
Mark K. Bucey, Byron, IL (US);
Shawn D. Sexton, Rockford, IL (US)

(73) Assignee: Gunite Corporation, Rockford, IL (US)

( * ) Notice: Subject to any disclaimer, the term of this patent is extended or adjusted under 35 U.S.C. 154(b) by 0 days.

(21) Appl. No.: 10/977,020

(22) Filed: Oct. 29, 2004

(65) Prior Publication Data

US 2006/0091723 A1    May 4, 2006

(51) Int. Cl.
*F16D 65/12* (2006.01)
*B60B 19/00* (2006.01)

(52) U.S. Cl. .............................. 188/218 XL; 188/18 A; 301/6.8; 301/105.1

(58) Field of Classification Search ............ 188/218 R, 188/218 XL, 250 G, 250 B, 382, 18 A; 301/105.1, 301/6.1, 6.8; 324/173; 303/166, 177
See application file for complete search history.

(56) References Cited

U.S. PATENT DOCUMENTS

| | | | |
|---|---|---|---|
| 3,626,226 A | | 12/1971 | Pauwels et al. |
| 3,772,548 A | | 11/1973 | Wroblewski et al. |
| 4,061,213 A | * | 12/1977 | Davy ..................... 188/181 R |
| RE29,509 E | | 1/1978 | Pauwels et al. |
| 4,161,120 A | | 7/1979 | Cloarec |
| 5,053,656 A | | 10/1991 | Hodge |
| 5,129,741 A | * | 7/1992 | Deane ........................ 384/448 |
| 5,296,805 A | * | 3/1994 | Clark et al. .................. 324/174 |
| 5,432,442 A | | 7/1995 | Andersen |
| 5,480,007 A | * | 1/1996 | Hartford .................... 188/18 A |
| 5,557,897 A | * | 9/1996 | Kranz et al. .................. 52/410 |
| 6,184,678 B1 | | 2/2001 | Kumamoto et al. |
| 6,568,512 B1 | * | 5/2003 | Tolani .................. 188/218 XL |
| 6,619,440 B2 | | 9/2003 | Antony et al. |
| 6,642,709 B2 | | 11/2003 | Heimann, Jr. et al. |
| 6,945,367 B1 | * | 9/2005 | Yuhas ....................... 188/18 R |

FOREIGN PATENT DOCUMENTS

| | | | |
|---|---|---|---|
| DE | 4230012 | | 3/1994 |
| EP | 0666478 | | 8/1995 |
| JP | 6300035 A | * | 10/1994 |

* cited by examiner

*Primary Examiner*—Melody M. Burch
(74) *Attorney, Agent, or Firm*—Michael Best & Friedrich LLP

(57) ABSTRACT

Exciter rings, wheel assemblies and methods of assembling. In some aspects, a wheel assembly includes a brake rotor including a barrel section having an interior surface defining a barrel cavity, and a projection extending from the interior surface of the barrel section into the barrel cavity. The wheel assembly also includes an exciter ring formed separately from the brake rotor and engagable with the projection within the barrel cavity to removably connect the exciter ring to the brake rotor. In other aspects, an exciter ring is formed separately from and removably connectable to a brake rotor and includes a body portion having an outer surface, the body portion including a detent protruding outwardly from the outer surface and extending around the outer surface of the body portion. The exciter ring also includes a flange extending radially outwardly from the body portion and having a plurality of apertures.

25 Claims, 3 Drawing Sheets

EXCITER RING FOR A BRAKE ROTOR

FIELD OF THE INVENTION

The present invention relates to braking systems for vehicles and, more particularly, to exciter rings for brake rotors.

BACKGROUND OF THE EMBODIMENT

Anti-lock braking systems ("ABS") are used to increase traction and control of a vehicle under difficult braking conditions. On slippery surfaces, braking can cause the wheel to "lock up" and stop rotating. As a result, the portion of the wheel in contact with the road simply slides relative to the surface, which severely reduces traction and the ability to steer the vehicle. The loss (reduction) of traction causes the truck or tractor-trailer to become unstable and directional control becomes difficult. This problem is of particular concern for heavy commercial vehicles, such as tractor-trailers, where the loss of control can cause the vehicle to jack-knife.

ABS systems prevent wheel lock up by rapidly releasing and reapplying pressure to the brakes, to permit the skidding wheel to regain traction and steering. ABS systems typically comprise a speed sensor positioned adjacent to four or more wheels of the vehicle. Each speed sensor is connected to a controller that monitors the acceleration/deceleration of the wheels. When wheel lock up occurs, the controller detects the abnormally abrupt deceleration of the wheel and operates a valve in the corresponding brake line to release pressure on the brake until the wheel begins to accelerate again. Once the controller senses the wheel accelerate, the controller reverses the valve to allow brake pressure to increase once more. The controller repeats this cycle of acceleration/deceleration many times per second, such that braking is kept near, but does not exceed, the point at which the wheel locks up.

Speed sensors typically operate by detecting the rate of rotation of the wheel hub, brake drum or brake rotor. In the case of an ABS brake rotor, evenly spaced teeth are integrally cast on the surface of the brake rotor in the shape of a ring. The ring of teeth is commonly referred to as a tone ring or exciter ring, and the teeth are referred to as pulse teeth or exciter teeth. A typical exciter ring has about 80 to 120 teeth, depending on the size of the tire. The sensor typically comprises a magnetic pickup that is positioned adjacent to the exciter ring and measures the speed of the rotor by detecting the change in magnetic flux caused by the movement of the exciter teeth.

A variety of methods are used to detect changes in magnetic flux, including variable reluctance, Hall effect and magnetic resistance, as are well known in the art. In each case, the strength of the signal received by the speed sensor decreases with distance from the exciter ring. Accordingly, some skill and care must be used to ensure that the speed sensor is positioned as close as possible to the exciter ring without actually contacting the exciter teeth.

ABS brake rotors also require additional steps of machining and inspection to ensure that the exciter teeth are uniform and that the exciter ring is not damaged. Brake rotors are typically cast in rough form and then machined to their finished dimensions. However, the numerous teeth of the exciter ring are difficult to cast and frequently have casting defects and imperfections which require the rotor to be scrapped. In addition, the exciter teeth are susceptible to damage caused by mishandling following the casting step of the manufacturing process, which increases the scrap rate. Furthermore, the exciter teeth must have uniform depth and clean surfaces for the speed sensors to function properly. Thus, the exciter ring requires an additional machining step to remove any imperfections that would interfere with the operation of the speed sensor. Further yet, the exciter ring is integral with the brake rotor and unrepairable damage to the exciter ring results in discarding of the entire brake rotor. Replacing entire brake rotors due to damaged exciter rings can become very expensive. In addition, dirt and other debris accumulates on the exciter ring, which increases the rate of corrosion. As a result, the exciter ring is frequently the limiting factor in the life of a brake rotor.

Thus, it would be desirable to provide an exciter ring that is formed separately from an ABS brake rotor and is removably connectable to the brake rotor to facilitate relatively easy replacement of the exciter ring when the exciter ring becomes damaged. In addition, it would be desirable to provide a simple, inexpensive, and quick process of refurbishing a wheel assembly when the exciter ring or exciter teeth are damaged.

SUMMARY OF THE INVENTION

In some aspects, the invention provides a wheel assembly having a brake rotor including a barrel section having an interior surface defining a barrel cavity, a brake disc extending radially outwardly from the barrel section and defining a disc cavity in communication with the barrel cavity, and a projection extending from the interior surface of the barrel section into the barrel cavity, and an exciter ring formed separately from the brake rotor and being engagable with the projection within the barrel cavity to removably connect the exciter ring to the brake rotor.

In some aspects, the invention provides an exciter ring formed separately from and removably connectable to a brake rotor, the exciter ring including a substantially cylindrical body portion having an inner surface and an outer surface, the inner surface defining a ring cavity, the body portion including a detent protruding outwardly from the outer surface and extending at least partially around the outer surface of the body portion, and a flange extending radially outwardly from the body portion and having a plurality of apertures therein.

In some aspects, the invention provides a wheel assembly including a brake rotor having a projection, and an exciter ring formed separately from and removably connectable to the brake rotor, the exciter ring including a body portion and a flange extending radially outwardly from the body portion, the body portion having an inner surface and an outer surface, the inner surface defining a ring cavity, the body portion including a detent protruding outwardly from the outer surface and extending at least partially around the outer surface of the body portion, the flange having a plurality of apertures therein, wherein the detent is engagable with the projection to removably connect the exciter ring to the brake rotor.

In some aspects, the invention provides a method of assembling a wheel assembly, the method including providing a brake rotor including a barrel section and a brake disc extending radially outwardly from the barrel section, the barrel section having an interior surface defining a barrel cavity and including a projection extending from the interior surface of the barrel section into the barrel cavity, the brake disc having a disc cavity, providing an exciter ring formed separately from the brake rotor, inserting the exciter ring through the disc cavity and into the barrel cavity, and engaging the exciter ring with the projection in the barrel section after inserting to removably connect the exciter ring to the brake rotor.

Figure 1:
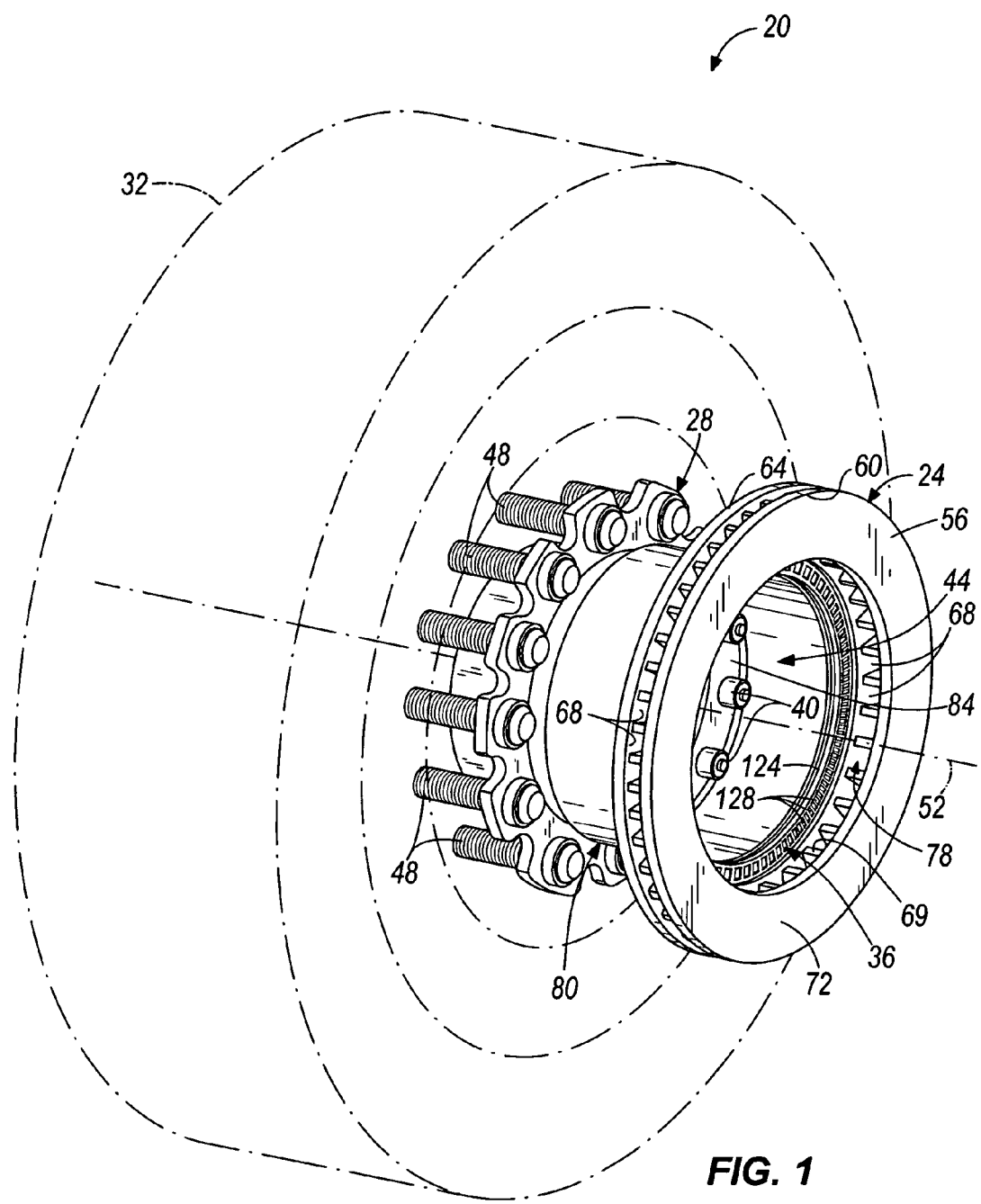
FIG. 1 is a perspective view of a wheel assembly including an exciter ring embodying aspects of the invention.
Figure 2:
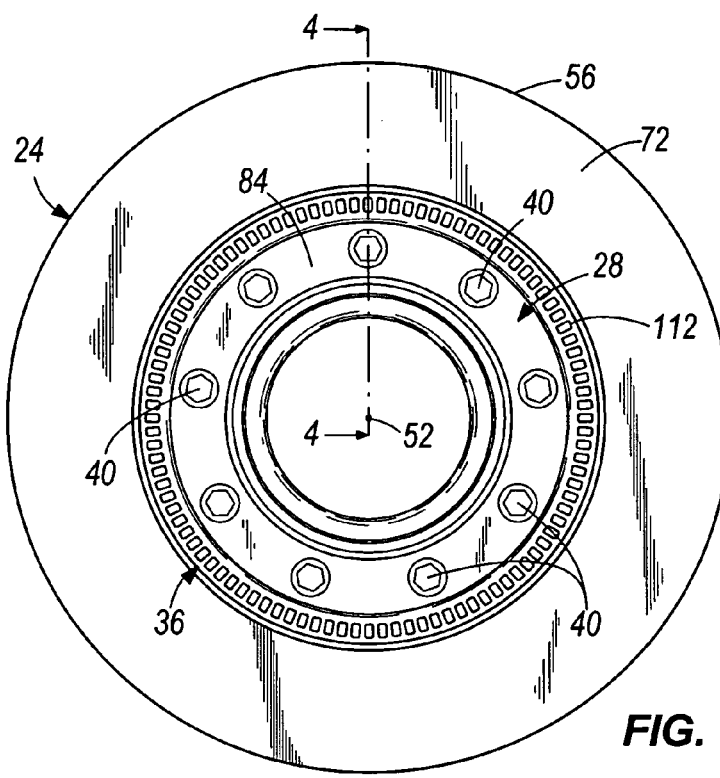
FIG. 2 is a front view of a wheel hub, a brake router and the exciter ring of the wheel assembly shown in FIG. 1.
Figure 3:
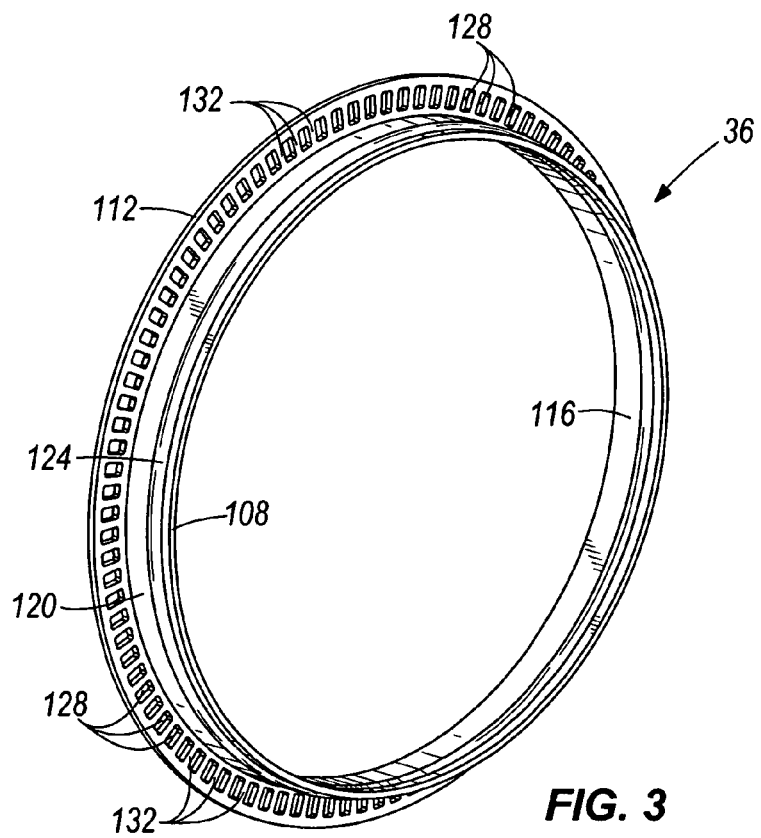
FIG. 3 is a rear perspective view of the exciter ring shown in FIGS. 1 and 2.

The invention is not limited in its application to the details of the construction and arrangements of the components set forth in the following description or illustrated in the drawings. The invention includes other embodiments and can be practiced or carried out in various different ways. Also, it is understood that the phraseology and terminology used herein is for the purpose of description and should not be regarded as limiting. The use of "including," "comprising," or "having" and variations thereof is meant to encompass the items listed thereafter and equivalents thereof as well as additional items. Unless limited otherwise, the terms "connected," "coupled," and variations thereof herein are used broadly and encompass direct and indirect connections and couplings. In addition, the terms "connected" and "coupled" and variations thereof are not restricted to physical or mechanical connections or couplings.

DETAILED DESCRIPTION

FIG. 1 illustrates a wheel assembly 20 including a brake rotor 24, a wheel hub 28, a tire or wheel 32, and an exciter ring 36. A brake pad (not shown) or other braking mechanism is engagable with the brake rotor 24 to control the rotation of the wheel 32. The wheel hub 28 is connected to the brake rotor 24 with a plurality of fasteners 40 and rotates with the brake rotor 24. The brake rotor 24 defines a rotor cavity 44 and the wheel hub 28 defines a hub cavity (not shown) therethrough that are aligned when the brake rotor 24 and wheel hub 28 are connected. The wheel hub 28 includes a plurality of fasteners 48, such as, for example a combination of lug nuts and lug bolts, for connecting the wheel 32 to the wheel hub 28 and facilitating rotation of the wheel 32 with the wheel hub 28 and the brake rotor 24. A wheel axle (not shown) has an end thereof inserted through the aligned cavities of the brake rotor 24 and wheel hub 28 and connected to the wheel hub 28. The wheel axle is connectable to a wheel assembly 20 at each end of the axle.

Figure 4:
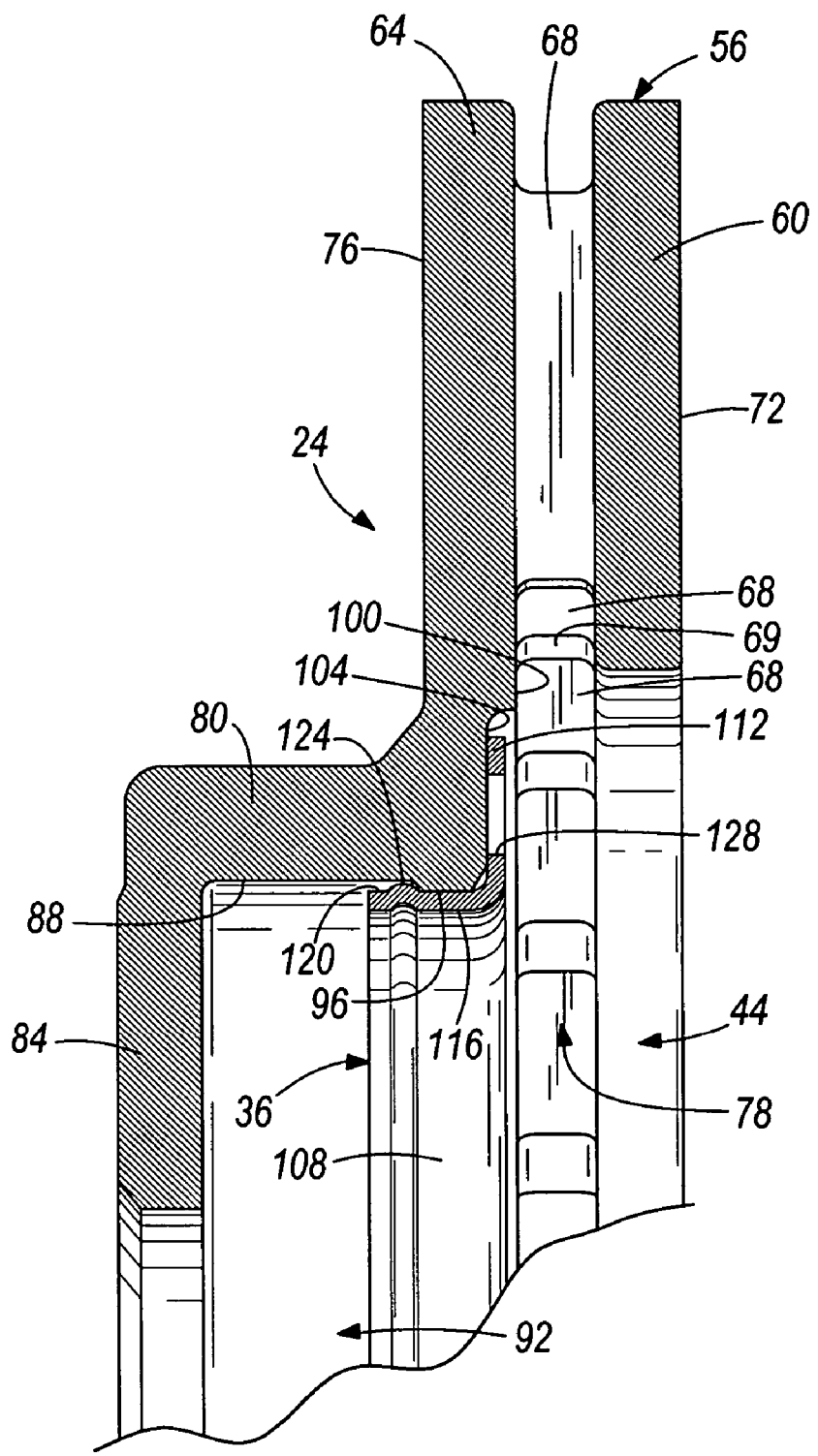
FIG. 4 is a partial cross sectional view of the brake rotor and the exciter ring, taken along line 4-4 in FIG. 2.

With reference to FIGS. 1 and 4, the brake rotor 24 defines a central longitudinal axis 52 through a center thereof about which the brake rotor 24 and the exciter ring 36 are symmetrically oriented. The brake rotor 24 includes a brake disc 56 having an inboard portion 60 and an outboard portion 64 that are separated by a series of vent holes 68, defined by spaced dividers 69, for cooling the rotor 24. An inboard brake surface 72 is formed on the inboard side of the inboard portion 60. Similarly, an outboard brake surface 76 is formed on the outboard side of the outboard portion 64. As used herein, the term "outboard" means facing away from or distal to the vehicle, and the term "inboard" means facing toward or proximal to the vehicle. The brake disc 56 has a disc cavity 78 that is defined in the brake disc 56 between the inboard brake surface 72 and an interior surface 100 (described in more detail below). The brake rotor 24 also includes a cylindrical barrel section 80 extending in the outboard direction from the brake disc 56. The barrel section 80 is provided with a radial flange 84 extending radially inwardly that has a series of apertures for receiving the fasteners 40 for attaching the brake rotor 24 to the wheel hub 28. The barrel section 80 also includes an interior barrel surface 88 that defines a barrel cavity 92 through the barrel section 80. A barrel projection 96 extends inwardly from the interior barrel surface 88 toward a center of the barrel section 80 to provide a reduced diameter mouth to the barrel cavity 92. In the illustrated construction, the barrel projection 96 extends into the barrel cavity 92 substantially perpendicular to the longitudinal axis 52. In some constructions, the barrel projection 96 is at least partially aligned with the outboard portion 64 of the brake disc 56 and is not between the inboard and outboard portions 60, 64 of the brake disc 56. The outboard portion 64 of the brake disc 56 forms an interior surface 100 adjacent the barrel section 80, and a recess 104 is formed in the interior surface 100 near the barrel section 80.

With reference to FIGS. 1-4, the exciter ring 36 includes a body portion 108 substantially cylindrical in shape and a ring flange 112 extending radially outward from the body portion 108. In the illustrated construction, the exciter ring 36 is formed by stamping, while in other constructions the exciter ring 36 is formed by molding. No matter what the manner used to form the exciter ring 36, the exciter ring 36 is formed separately from the brake rotor 24.

In the illustrated construction, the ring flange 112 extends substantially perpendicular from the body portion 108. The body portion 108 has an interior body surface 116 and an exterior body surface 120 and includes a detent 124 that extends outwardly from and completely around the exterior body surface 120 of the body portion 108. In some constructions, the detent 124 does not extend completely around the exterior body surface 120 of the body portion 108. In other constructions, a plurality of detents are spaced from one another around the exterior body surface 120 of the body portion 108. A plurality of evenly spaced apertures 128 are defined in the ring flange 112 to define a plurality of exciter teeth 132. The number of apertures 128 and exciter teeth 132 can vary depending on the size of the wheel 32 and/or the braking system being used with the wheel 32 and exciter ring 36.

With particular reference to FIG. 4, assembly of the exciter ring 36 and the brake rotor 24 will be described. The exciter ring 36 is positioned for assembly with the body portion 108 oriented toward the brake rotor 24 and aiming in the outboard direction and the ring flange 112 oriented generally parallel to the brake disc 56. The body portion 108 is aligned with the barrel cavity 92 such that the longitudinal axis 52 substantially extends through a center of the body portion 108. The body portion 108 of the exciter ring 36 is sized slightly larger than the reduced diameter portion of the barrel cavity 92 defined by the barrel projection 96. The exciter ring 36 is inserted along the longitudinal axis 52 in the outboard direction and is forced into the barrel cavity 92, which slightly deflects the body portion 108 inwardly to allow the detent 124 to pass by the barrel projection 96. Once the detent 124 passes by the projection 96, the body portion 108 flexes outwardly to position the detent 124 on the outboard side of the barrel projection 96 and position the ring flange 112 in the recess 104 defined in the interior surface 100 of the brake disc 56. The exciter ring 36 is connected to the brake rotor 24 when the detent 124 is positioned on the outboard side of and in some constructions, engaged with the barrel projection 96 and when the outboard surface of the ring flange 112 engages the interior surface 100 of the brake disc 56 within the recess 104. The exciter ring 36 and reduced diameter portion of the barrel cavity 92 defined by the barrel projection 96 are appropriately sized to secure the exciter ring 36 to the brake rotor 24 by a friction or interference connection. In some constructions, the body portion 108 is sized so that the distance between the detent 124 and ring flange 112 is only slightly larger than the width of the barrel projection 96, so that the exciter ring fits snugly against the interior barrel surface 88 and the interior surface 100 within the recess 104 of the brake disc 56. An adequate amount of force must be applied to the exciter ring 36 in an outboard direction to connect the exciter ring 36 to the brake rotor 24 and an adequate amount of force must be applied to the exciter ring 36 in an inboard direction to disconnect the exciter ring 36 from the brake rotor 24. The exciter ring 36 and brake rotor 24 are configured such that the adequate amount of force required to disconnect the exciter ring 36 from the brake rotor 24 is larger than any force that may be applied to the exciter ring 36 in the inboard direction during normal operating conditions of the wheel assembly 20.

Upon assembly of the exciter ring 36 and the brake rotor 24 and operation of the wheel assembly 20, a sensor (not shown) of the ABS brake rotor 24 is positioned adjacent to the exciter ring 36 and measures the speed of the rotor 24 by detecting the change in magnetic flux caused by the movement of the exciter teeth 132 separated by the apertures 128 in the exciter ring 36.

In case of wear, damage, uncleanliness, etc. to the exciter ring 36, the exciter ring 36 can be simply removed and replaced with another exciter ring 36, rather than machining or cleaning of the exciter ring 36 or even disposal of the entire brake rotor which was necessary in previous brake rotors. The current exciter ring 36 eliminates the need for lengthy repair or cleaning services necessary to return the brake rotor and exciter ring to operating condition and does so in a relatively inexpensive manner.

Although particular constructions of the present invention have been shown and described, other alternative constructions will be apparent to those skilled in the art and are within the intended scope of the present invention. Thus, the present invention is to be limited only by the claims.

What is claimed is:

1. A method of assembling a wheel assembly, the method comprising:
   providing a brake rotor including a barrel section and a brake disc extending radially outwardly from the barrel section, the barrel section having an interior surface defining a barrel cavity and including a projection extending from the interior surface of the barrel section into the barrel cavity, the brake disc having a disc cavity;
   providing an exciter ring formed separately from the brake rotor;
   inserting the exciter ring through the disc cavity and into the barrel cavity; and
   engaging the exciter ring with the projection in the barrel section to removably connect the exciter ring to the brake rotor;
   wherein the exciter ring includes a detent and the wheel assembly defines an inboard side and an outboard side, and wherein inserting includes inserting the exciter ring into the barrel cavity from the inboard side to the outboard side, the detent passing by the projection from the inboard side to the outboard side upon insertion and the detent being positioned on the outboard side of the projection when the exciter ring is connected to the brake rotor.

2. The method of claim 1, wherein providing an exciter ring includes providing an exciter ring including a body portion and a ring flange extending radially outwardly from the body portion, wherein the detent protrudes from the body portion.

3. A wheel assembly comprising:
   a brake rotor including a barrel section and a brake disc extending radially outward from the barrel section, the brake disk including an inboard braking portion and an outboard braking portion spaced from the inboard braking portion, the inboard braking portion and the outboard braking portion each having an inboard surface, the brake disc defining a disc cavity between the inboard surfaces of the inboard braking portion and the outboard braking portion, the barrel section including an interior surface defining a barrel cavity in an outboard direction from the inboard surface of the outboard braking portion of the brake disc, the brake rotor also including a projection extending from the interior surface of the barrel section into the barrel cavity; and
   an exciter ring formed separately from the brake rotor and being engagable with the projection within the barrel cavity to removably connect the exciter ring to the brake rotor;
   wherein the exciter ring includes a body portion and a ring flange extending radially outward from the body portion, and wherein a detent is defined in the body portion and a plurality of apertures are defined in the ring flange, the detent being engagable with the projection within the barrel cavity to removably connect the exciter ring to the brake rotor; and
   wherein the exciter ring is at least partially insertable into the barrel cavity such that the detent passes by the projection to selectively connect the exciter ring to the barrel section.

4. The wheel assembly of claim 3, wherein the body portion and the ring flange are substantially perpendicular with respect to one another.

5. The wheel assembly of claim 3, wherein the body portion includes an inner surface and an outer surface, the detent projecting outwardly from the outer surface of the body portion.

6. The wheel assembly of claim 3, wherein the detent extends completely around the outer surface of the body portion.

7. The wheel assembly of claim 3, wherein the detent is one of a plurality of detents, the plurality of detents being spaced from one another and protruding outwardly from the outer surface of the body portion.

8. A wheel assembly comprising:
   a brake rotor including a barrel section and a brake disc extending radially outward from the barrel section, the brake disk including an inboard braking portion and an outboard braking portion spaced from the inboard braking portion, the inboard braking portion and the outboard braking portion each having an inboard surface, the brake disc defining a disc cavity between the inboard surfaces of the inboard braking portion and the outboard braking portion, the barrel section including an interior surface defining a barrel cavity in an outboard direction from the inboard surface of the outboard braking portion of the brake disc, the brake rotor also including a projection extending from the interior surface of the barrel section into the barrel cavity; and an exciter ring formed separately from the brake rotor and being engagable with the projection within the barrel cavity to removably connect the exciter ring to the brake rotor;

wherein the exciter ring includes a body portion and a ring flange extending from the body portion, wherein a detent is defined in the body portion and a plurality of apertures are defined in the ring flange, the detent being engagable with the projection within the barrel cavity to removably connect the exciter ring to the brake rotor, and wherein the ring flange engages the brake disc when the exciter ring is connected to the barrel section; and wherein the brake disc has a surface, and wherein the detent is spaced a distance from the ring flange, the distance being slightly larger than a width of the projection such that when the exciter ring is connected to the brake rotor, the body portion of the exciter ring tightly fits against the interior surface of the barrel section and the ring flange tightly fits against the surface of the brake disc.

9. The wheel assembly of claim 8, wherein the body portion is substantially cylindrical and has an inner surface and an outer surface, the inner surface defining a ring cavity, wherein the detent protrudes outwardly from the outer surface and extends at least partially around the outer surface of the body portion; and wherein the flange extends radially outwardly from the body portion.

10. The wheel assembly of claim 9, wherein the detent extends completely around the outer surface of the body portion.

11. The wheel assembly of claim 8, wherein the flange extends substantially perpendicular from the body portion.

12. The wheel assembly of claim 8, wherein the exciter ring is formed by stamping.

13. The wheel assembly of claim 8, wherein the exciter ring has a substantially L-shaped cross-section.

14. The wheel assembly of claim 8, wherein the body portion has a first end from which the flange extends and a second end, the detent being positioned nearer the second end than the first end and being spaced inwardly from the second end.

15. The wheel assembly of claim 8, wherein the detent is one of a plurality of detents, the plurality of detents being spaced from one another and protruding outwardly from the outer surface of the body portion.

16. The wheel assembly of claim 8, wherein the barrel section defines a longitudinal axis through a longitudinal center thereof and through a longitudinal center of the barrel cavity, and wherein the projection extends into the barrel cavity substantially perpendicular to the longitudinal axis.

17. A wheel assembly comprising:
a brake rotor including a barrel section and a brake disc extending radially outward from the barrel section, the brake disk including an inboard braking portion and an outboard braking portion spaced from the inboard braking portion, the inboard braking portion and the outboard braking portion each having an inboard surface, the brake disc defining a disc cavity between the inboard surfaces of the inboard braking portion and the outboard braking portion, the barrel section including an interior surface defining a barrel cavity in an outboard direction from the inboard surface of the outboard braking portion of the brake disc, the brake rotor also including a projection extending from the interior surface of the barrel section into the barrel cavity; and an exciter ring formed separately from the brake rotor and being engagable with the projection within the barrel cavity to removably connect the exciter ring to the brake rotor;

wherein the exciter ring includes a body portion and a ring flange extending from the body portion, wherein a detent is defined in the body portion and a plurality of apertures are defined in the ring flange, the detent being engagable with the projection within the barrel cavity to removably connect the exciter ring to the brake rotor, and wherein the ring flange engages the brake disc when the exciter ring is connected to the barrel section; and wherein the wheel assembly defines an inboard side and an outboard side, the inboard side facing toward or being proximal to a vehicle to which the wheel assembly is coupled and the outboard side facing away from or being distal to the vehicle, and wherein the body portion of the exciter ring is insertable into the barrel cavity from the inboard side to the outboard side and the detent is positioned on the outboard side of the projection when the exciter ring is connected to the brake rotor.

18. The wheel assembly of claim 17, wherein the body portion is substantially cylindrical and has an inner surface and an outer surface, the inner surface defining a ring cavity, wherein the detent protrudes outwardly from the outer surface and extends at least partially around the outer surface of the body portion, and wherein the flange extends radially outwardly from the body portion.

19. The wheel assembly of claim 18, wherein the detent extends completely around the outer surface of the body portion.

20. The wheel assembly of claim 17, wherein the flange extends substantially perpendicular from the body portion.

21. The wheel assembly of claim 17, wherein the exciter ring is formed by stamping.

22. The wheel assembly of claim 17, wherein the exciter ring has a substantially L-shaped cross-section.

23. The wheel assembly of claim 17, wherein the body portion has a first end from which the flange extends and a second end, the detent being positioned nearer the second end than the first end and being spaced inwardly from the second end.

24. The wheel assembly of claim 17, wherein the detent is one of a plurality of detents, the plurality of detents being spaced from one another and protruding outwardly from the outer surface of the body portion.

25. The wheel assembly of claim 17, wherein the barrel section defines a longitudinal axis through a longitudinal center thereof and through a longitudinal center of the barrel cavity, and wherein the projection extends into the barrel cavity substantially perpendicular to the longitudinal axis.

* * * * *